(12) United States Patent
Joseph

(10) Patent No.: US 7,946,458 B2
(45) Date of Patent: May 24, 2011

(54) CARGO RACK ASSEMBLIES AND VEHICLES HAVING CARGO RACK ASSEMBLIES

(75) Inventor: Rowdy L. Joseph, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 11/855,639

(22) Filed: Sep. 14, 2007

(65) Prior Publication Data

US 2009/0071993 A1 Mar. 19, 2009

(51) Int. Cl.
*B60P 7/08* (2006.01)
*B60R 9/06* (2006.01)

(52) U.S. Cl. ............ 224/484; 224/534; 224/568; 410/7; 410/23

(58) Field of Classification Search .............. 224/42.39, 224/324, 401, 417, 418, 438, 484, 488, 489, 224/492, 493, 522, 534, 568, 572; 410/10, 410/11, 23, 111, 114, 116, 7, 12, 100, 103; 242/385, 385.1, 385.2, 385.3, 385.4
See application file for complete search history.

(56) References Cited

U.S. PATENT DOCUMENTS

| | | |
|---|---|---|
| 4,842,458 A | 6/1989 | Carpenter |
| 5,282,706 A | 2/1994 | Anthony et al. |
| 5,292,089 A | 3/1994 | Whitman et al. |
| 5,845,370 A | 12/1998 | Cohoon |
| 5,961,263 A | 10/1999 | Nunez |
| 6,109,846 A | 8/2000 | Davis et al. |
| 6,149,361 A * | 11/2000 | Schrader ........................ 410/102 |
| 6,179,180 B1 * | 1/2001 | Walker .......................... 224/401 |
| 6,182,784 B1 * | 2/2001 | Pestotnik ....................... 180/376 |
| 6,250,578 B1 * | 6/2001 | Manda ........................ 242/378.1 |
| 6,524,041 B1 | 2/2003 | Voiculescu |
| 6,623,224 B2 * | 9/2003 | Schrader .......................... 410/97 |
| 6,793,449 B1 | 9/2004 | Simpson et al. |
| 6,908,269 B1 * | 6/2005 | Youngs et al. ................ 410/100 |
| 6,957,938 B1 | 10/2005 | Beasley |
| 2003/0059269 A1 * | 3/2003 | Bosley .......................... 410/100 |

* cited by examiner

*Primary Examiner* — Justin M Larson
*Assistant Examiner* — Adam Waggenspack
(74) *Attorney, Agent, or Firm* — Ulmer & Berne LLP

(57) ABSTRACT

A cargo rack assembly is provided for a vehicle. The cargo rack assembly defines an inner region and includes a restraint assembly disposed at least partially within the inner region. The restraint assembly includes a belt and a carrier. The belt extends between a first end portion and a second end portion. The second end portion of the belt is attached to the carrier. The carrier is configured to facilitate selective dispensation of the first end portion of the belt between a stored position in which the first end portion is adjacent to the cargo rack assembly, and an extended position in which the first end portion is spaced from the cargo rack assembly. A vehicle including a cargo rack assembly is also provided.

19 Claims, 5 Drawing Sheets

CARGO RACK ASSEMBLIES AND VEHICLES HAVING CARGO RACK ASSEMBLIES

TECHNICAL FIELD

A vehicle includes a cargo rack assembly having a restraint assembly. In one embodiment, the vehicle may comprise an all terrain vehicle.

BACKGROUND

A conventional all terrain vehicle ("ATV") includes a cargo rack assembly supported by a chassis. The cargo rack assembly may support various articles (e.g., a tent, a knapsack, a water bottle) for transportation by the ATV. Additionally, the cargo rack assembly may provide an attachment location for securing the ATV to a transport vehicle. As is common, one or many restraints (e.g., straps, ropes, wires) are separately furnished by a user to facilitate attachment of the ATV to the transport vehicle by way of the cargo rack assembly. However, separately furnished restraints may become easily tangled, may be sized incorrectly, and are often prone to being misplaced.

SUMMARY

In accordance with one embodiment, a cargo rack assembly comprises a frame and a restraint assembly. The frame defines a cargo support surface and an inner region. The restraint assembly is disposed at least partially within the inner region of the frame and comprises a belt and a carrier. The belt extends between a first end portion and a second end portion. The second end portion of the belt is attached to the carrier. The carrier is movably attached to the frame and is configured to facilitate selective dispensation of the first end portion of the belt from a stored position in which the first end portion is adjacent to the frame and an extended position in which the first end portion is spaced from the frame.

In accordance with another embodiment, a vehicle comprises a chassis and a cargo rack assembly. The cargo rack assembly is supported by the chassis and comprises a frame and a restraint assembly. The frame defines a cargo support surface and an inner region. The restraint assembly is disposed at least partially within the inner region of the frame and comprises a belt and a carrier. The belt extends between a first end portion and a second end portion. The second end portion of the belt is attached to the carrier. The carrier is movably attached to the frame and is configured to facilitate selective dispensation of the first end portion of the belt from a stored position in which the first end portion is adjacent to the frame and an extended position in which the first end portion is spaced from the frame.

In accordance with yet another embodiment, an all terrain vehicle comprises a chassis, at least one wheel, a powertrain, and a cargo rack assembly. The chassis extends between a front end and a rear end. The at least one wheel is rotatably supported by the chassis. The powertrain is operably coupled with the wheel. The cargo rack assembly is supported by the chassis and defines a first inner region and a second inner region. The cargo rack assembly comprises a first restraint assembly and a second restraint assembly. The first restraint assembly is disposed at least partially within the first inner region of the cargo rack assembly. The first restraint assembly comprises a first belt and a first carrier. The first belt extends between a first end portion and a second end portion. The second end portion of the first belt is attached to the first carrier. The first carrier is configured to facilitate selective dispensation of the first end portion of the first belt from a first stored position in which the first end portion is adjacent to the cargo rack assembly, and a first extended position in which the first end portion is spaced from the cargo rack assembly. The second restraint assembly is disposed at least partially within the second inner region of the cargo rack assembly. The second restraint assembly comprises a second belt and a second carrier. The second belt extends between a third end portion and a fourth end portion. The fourth end portion of the second belt is attached to the second carrier. The second carrier is configured to facilitate selective dispensation of the third end portion of the second belt from a second stored position in which the third end portion is adjacent to the cargo rack assembly, and a second extended position in which the third end portion is spaced from the cargo rack assembly.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
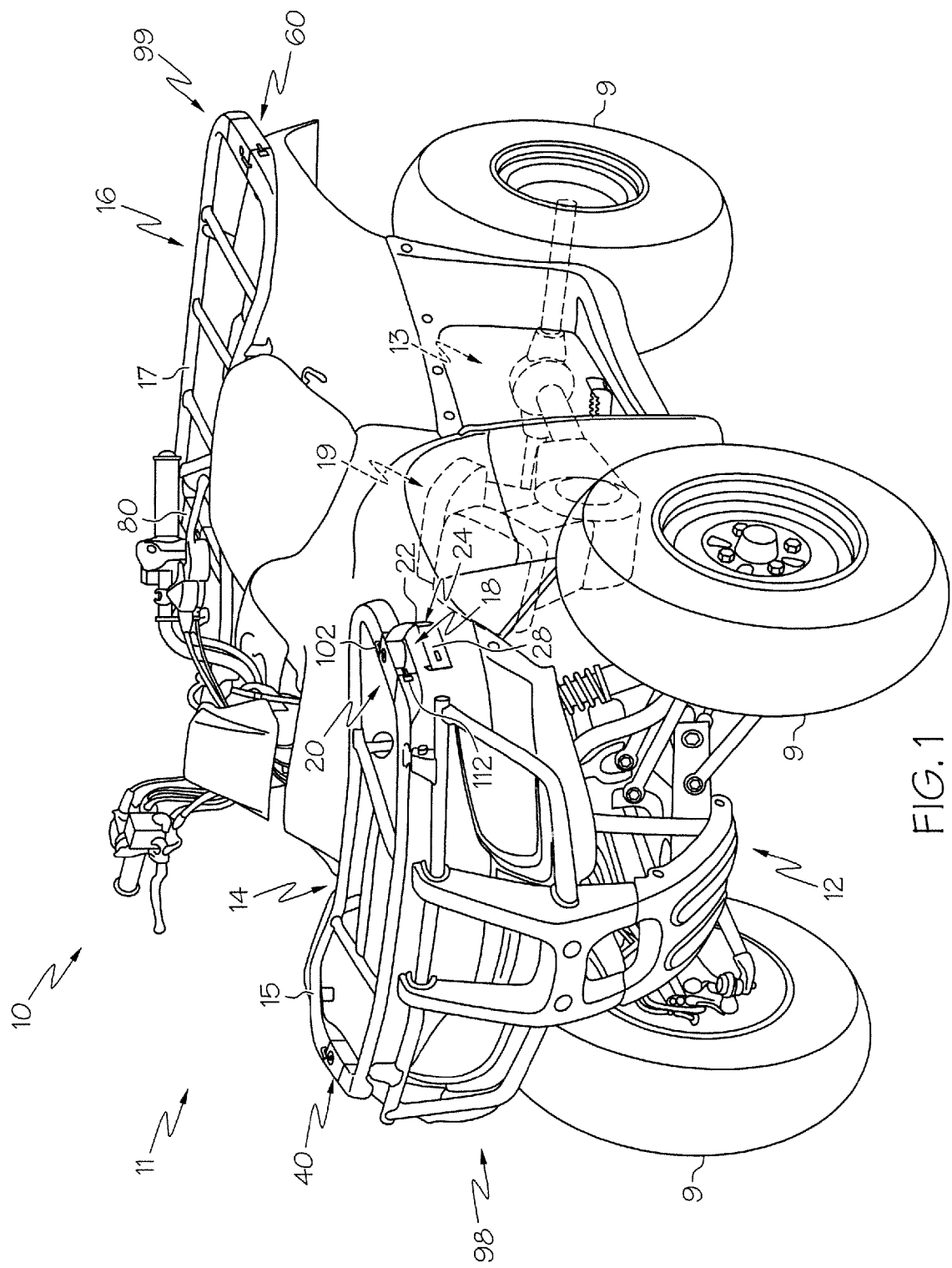
FIG. 1 is a front perspective view depicting an all terrain vehicle in accordance with one embodiment.

The present invention and its operation are hereinafter described in detail in connection with the views and examples of FIGS. 1-5, wherein like numbers may indicate the same or corresponding elements throughout the views. A cargo rack assembly in accordance with one embodiment can be provided upon a vehicle such as, for example, an ATV, an automobile, a recreational vehicle, a utility vehicle, or a toy. In one embodiment, and as depicted in FIG. 1, a cargo rack assembly 11 may be provided on an ATV 10. The ATV 10 may comprise a chassis 12 extending between a front end 98 and a rear end 99. The ATV 10 may additionally comprise wheels 9 which are rotatably supported by the chassis 12 such that the wheels 9 are rotatable as the ATV 10 travels. The ATV 10 may additionally comprise a powertrain 13 which is operably coupled with at least one of the wheels 9. As illustrated in FIG. 1, the powertrain 13 may be coupled to an engine 19 to transmit power from the engine 19 to at least one of the wheels 9 to propel the ATV 10.

The chassis 12 may support the cargo rack assembly 11. In one embodiment, the cargo rack assembly 11 may be attached directly to the chassis 12 (e.g., bolted, welded, or any of a variety of other suitable direct attachments). In another embodiment, the cargo rack assembly 11 may be attached indirectly to the chassis 12 (e.g., attached to a body shell which is attached to the chassis 12). The cargo rack assembly 11 may be configured to support cargo (e.g., water bottles, knapsacks, tents) for transportation by the ATV 10. The cargo rack assembly 11 may also provide an attachment location for securing the ATV 10 to various articles or other vehicles.

Figure 2:
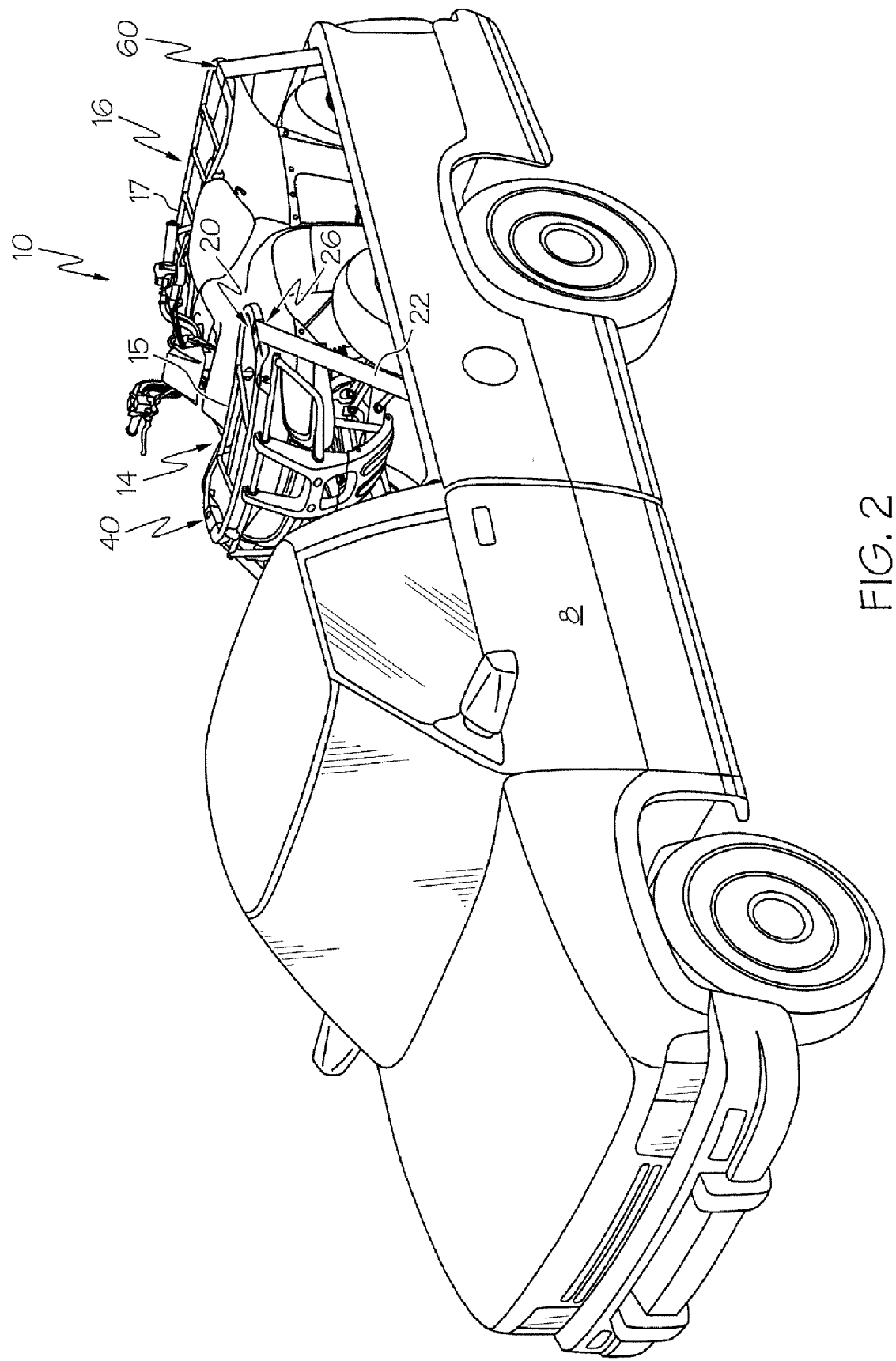
FIG. 2 is a front perspective view depicting the all terrain vehicle of FIG. 1 secured to a transport vehicle.
Figure 3:
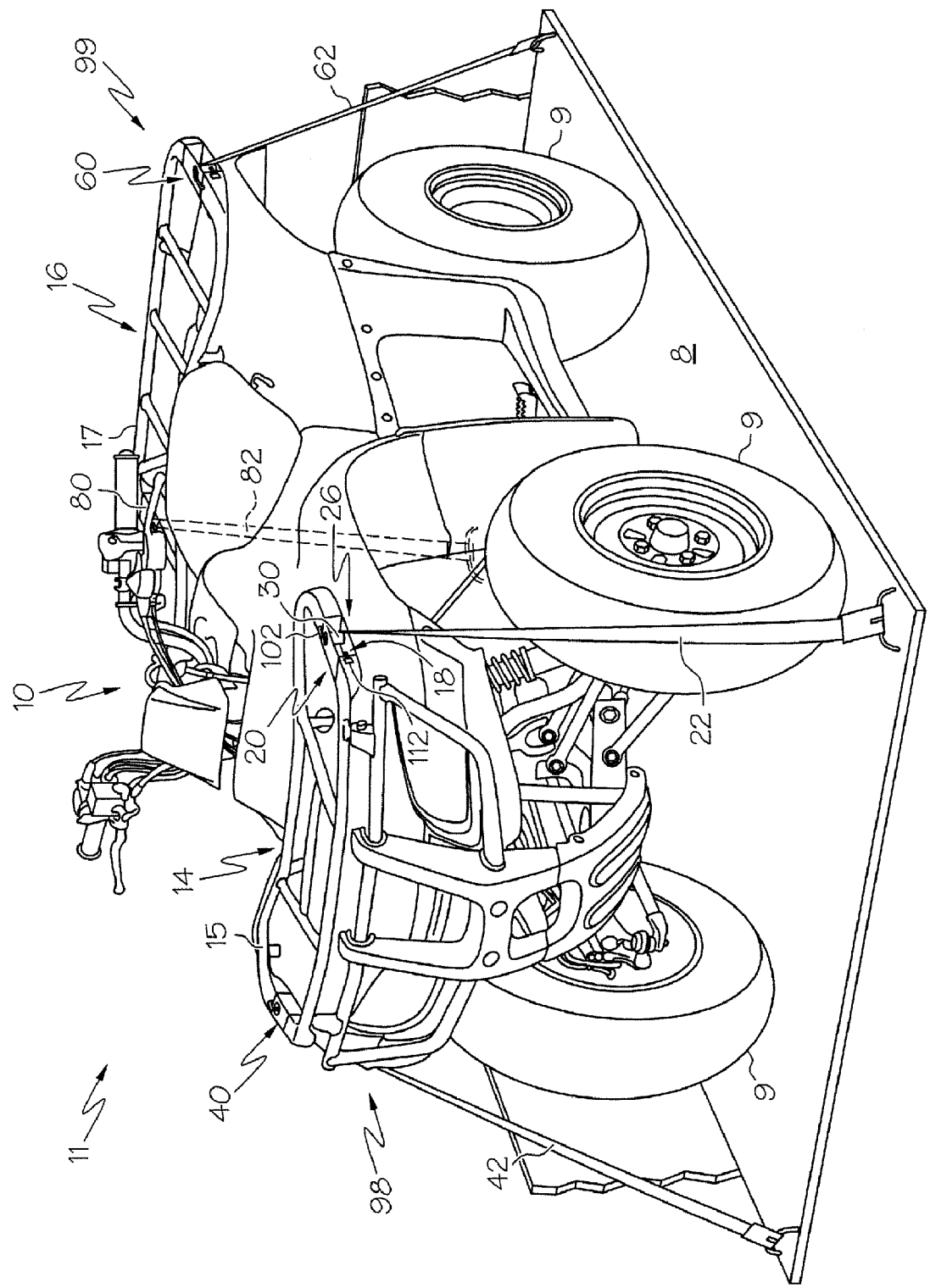
FIG. 3 is an enlarged front perspective view depicting the all terrain vehicle secured to the transport vehicle of FIG. 2, wherein the transport vehicle is partially cut-away for clarity of illustration.

As shown in FIGS. 1-3, the cargo rack assembly 11 may comprise frames 14 and 16. In particular, the frame 14 may be disposed adjacent to the front end 98 of the chassis 12, and the frame 16 may be disposed adjacent to the rear end 99 of the chassis 12. However, one or more frames can alternatively be provided at any of a variety of other suitable locations upon an ATV. For example, a cargo rack assembly can alternatively comprise a single frame (e.g., 14) disposed adjacent to a front end of an ATV. As another example, a cargo rack assembly can comprise a single frame (e.g., 16) disposed adjacent to a rear end of an ATV. In still another example, a cargo rack assembly may comprise more than two frames (e.g., four frames respectively disposed adjacent to front, rear, left, and right sides of an ATV).

In one embodiment, as shown in FIGS. 1-3, the frames 14, 16 may each comprise a rigid tubular structure having a plurality of interconnected rigid tubular members. In another embodiment, the frames may each comprise a rigid structure having a plurality of interconnected solid elongate members. In yet another embodiment, the frames may each comprise a rigid solid structure such as a planar member (e.g., formed from metal plate material). It will be appreciated that the frames can be formed from any of a variety of suitable materials (e.g., steel, plastic, fiberglass, carbon fiber or the like) and/or in any of a variety of suitable configurations (e.g., a continuous elongate member, a rigid meshed surface, a soft sided container).

The frames 14, 16 may define respective cargo support surfaces 15, 17 which are configured for supporting cargo for transportation by the ATV 10. In one embodiment, and as illustrated in FIGS. 1-3, the cargo support surfaces 15, 17 may be provided by respective uppermost portions of the frames 14, 16. However, it will be appreciated that cargo support surfaces may be provided in any of a variety of suitable alternative configurations or arrangements.

Figure 5:
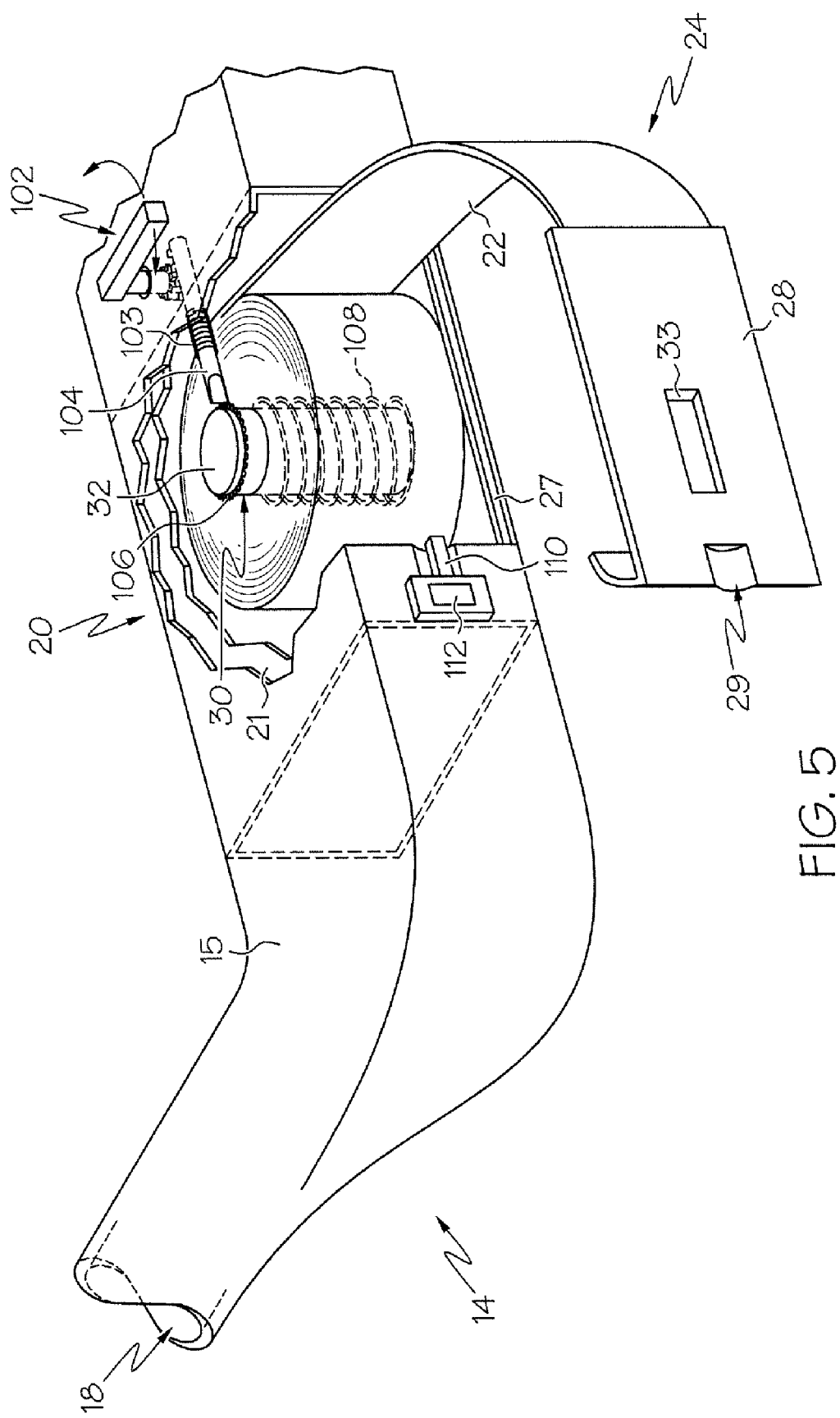
FIG. 5 is a front perspective view depicting the portion of the cargo rack assembly of FIG. 4, wherein the belt of the restraint assembly is in an extended position, and wherein certain portions are cut away for clarity of illustration.

The cargo rack assembly 11 may comprise one or more restraint assemblies to facilitate securement of the ATV 10 to various articles (as will be described further herein) or to a transport vehicle (e.g., 8 as shown in FIGS. 2 and 3). For example, a restraint assembly 20 is shown to be disposed at least partially within an inner region 18 defined by the frame 14. In one embodiment, and as illustrated in FIG. 5, for example, the inner region 18 may be at least partially defined by a central channel in a hollow elongated frame tube. In another embodiment, and as also illustrated in FIG. 5, the inner region may be at least partially defined by a recess in the frame 14. In yet another embodiment, the inner region may be defined by members protruding from a frame. It will therefore be appreciated that an inner region may be provided in any of a variety of suitable alternative configurations and arrangements. It will also be appreciated that one or more inner regions of one or more frames can also facilitate provision of additional restraint assemblies (e.g., 40, 60, and 80 described below).

As illustrated in FIGS. 1-3 and 5, the restraint assembly 20 may comprise a belt 22 which extends between a first end portion 24 and a second end portion 26. In such an embodiment, the belt 22 may comprise a woven fabric strap, but can alternatively be formed from any of a variety of suitable materials (e.g., steel, natural fibers), and in any of a variety of suitable configurations. In another embodiment, the belt may comprise other flexible materials such as, for example, a rope, a chain, or another type of strap. In yet another embodiment, a belt may comprise a rigid elongate member.

Figure 4:
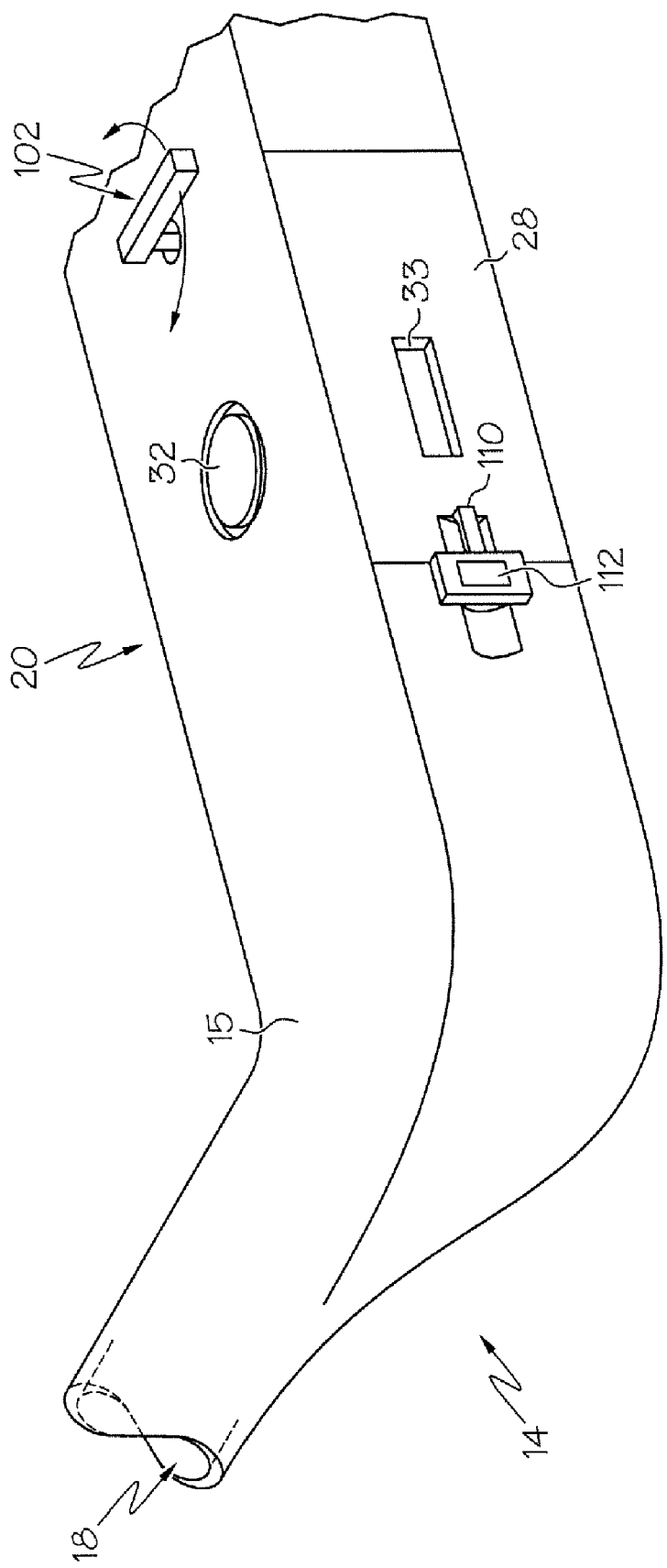
FIG. 4 is an enlarged front perspective view depicting a portion of a cargo rack assembly of the all terrain vehicle of FIG. 1, wherein the belt of the restraint assembly is in a stored position.

The restraint assembly 20 may further comprise a carrier which is attached to the second end portion 26 of the belt 22. The carrier can be configured to facilitate selective dispensation of the first end portion 24 of the belt 22 between a stored position and an extended position. When in the stored position, the first end portion 24 of the belt 22 may be disposed adjacent to the frame 14, as illustrated in FIG. 4. Conversely, when in an extended position, the first end portion 24 of the belt 22 may be spaced from the frame 14, as illustrated in FIG. 3, so as to facilitate attachment of the first end portion 24 of the belt 22 to an article or another vehicle.

In one embodiment, as shown in FIG. 5, the carrier may comprise a spool 30. The spool 30 may be attached to the second end portion 26 of the belt 22 and may selectively rotate to facilitate dispensation of the first end portion 24 of the belt 22 between a stored position and an extended position. In this configuration, when the belt 22 is in the stored position, a substantial portion of the belt 22 can be wrapped around the spool 30. When the belt 22 is dispensed from the stored position to an extended position, as shown in FIG. 5, a significant portion of the belt 22 can be removed from being wrapped around the spool 30.

It will be appreciated that a carrier may comprise any of a variety of alternative mechanical arrangements or configurations to facilitate dispensation of a belt between stored and extended positions. For example, in one alternative embodiment, in which a belt comprises a strap, a carrier may comprise a collecting member which is attached to a second end portion of the belt. The collecting member may pendulate with respect to a frame for incrementally contacting portions of the belt to facilitate selective accordion-type dispensation and collection of a first end portion of the belt. In yet another embodiment, in which a belt comprises a chain, a carrier may comprise a sprocket configured to selectively dispense the chain from a reservoir. In yet another embodiment, in which a belt comprises a rigid elongate member, a carrier may comprise a pivot (e.g., a ball-socket) attached to a second end portion of the rigid elongate member to facilitate dispensation of a first end portion of the rigid elongate member.

In one embodiment, as illustrated in FIG. 5, a housing 21 may be at least substantially completely (i.e., substantially completely or completely) disposed within the inner region 18 of the frame 14. The housing 21 can be attached to the frame 14 such as with welding, fasteners, and/or adhesives, for example. In such a configuration, the spool 30 can be movably attached to the housing 21 such that the spool 30 is indirectly attached to the frame 14 via the housing 21 and is also disposed within the inner region 18 of the frame 14. In other embodiments, a carrier (e.g., a spool) can be attached directly to the frame of a cargo rack assembly, and without the presence of a housing.

As shown in FIG. 5, the spool 30 may be rotatably attached to the housing 21 and can be disposed substantially within the inner region 18 of the frame 14. In particular, the spool 30 may be rotatably supported within the inner region 18 by a pin 32. Rotatable supports (e.g., bearings, bushings, or magnetic suspension) may facilitate rotation of the pin 32 and/or the spool 30 with respect to the housing 21 and/or the frame 14 to facilitate selective dispensation of the belt 22 between the stored position and an extended position. However, it will be appreciated that a spool or other carrier can be movably attached to a housing and/or a frame in any of a variety of other suitable arrangements or configurations.

The restraint assembly 20 may further comprise a resilient member. For example, as shown in FIG. 5, the resilient member may comprise a spring 108 which is attached to the housing 21 and the spool 30. When the first end portion 24 of the belt 22 is moved from the stored position to an extended position, the spring 108 may wind about the pin 32 such that tension remains on the belt 22 by way of the spool 30. When the first end portion 24 of the belt 22 is moved from an extended position to the stored position, the spring 108 can facilitate rotation of the spool 30 such that the belt 22 may be automatically collected onto the spool 30. In embodiments lacking a housing (e.g., 21), it will be appreciated that a spring might be attached to a frame and a spool. It will also be appreciated that a restraint assembly can include one or more springs or other resilient members provided in any of a variety of alternative arrangements, or might alternatively be constructed without the presence of any resilient members.

A restraint assembly may further comprise an actuator configured to facilitate an operator's selective locking and unlocking of a carrier, and resultant control over dispensation of a belt from the restraint assembly. For example, as shown in FIG. 5, the actuator may comprise a handle 102 and a locking member 104. The handle 102 may be connectedly engaged with the locking member 104 such that movement of the handle 102 correspondingly moves the locking member 104 to and from engagement with a toothed wheel 106 attached to the spool 30. In particular, movement of the locking member 104 into engagement with the toothed wheel 106 (shown in FIG. 5) can result in locking of the spool 30 with respect to the housing 21 and the frame 14, and resultant prevention of additional portions of the belt 22 from being dispensed from the restraint assembly 20. Movement of the locking member 104 from engagement with the toothed wheel 106 can free the spool 30 (i.e., to rotate), and can resultantly facilitate dispensation of the belt 22 onto or from the spool 30. Accordingly, the handle 102 can be used by an operator to selectively prevent the locking member 104 from engaging the toothed wheel 106 when the operator is adjusting the length of belt 22 dispensed from the restraint assembly 20. Once the desired length of belt 22 is dispensed (e.g., when the belt 22 is tightly holding an article upon the frame 14 and/or the ATV 10 to the transport vehicle 8), an operator can then use the handle 102 to selectively engage the locking member 104 with the toothed wheel 106.

A biasing member (e.g., 103 in FIG. 5) might be provided to selectively maintain the locking member 104 in engagement with the toothed wheel 106 during such time as when the handle 102 is not being held by an operator. In another embodiment, the handle 102 might be configured to enable an operator to adjust the amount of tension provided by the belt 22 (e.g., through a ratcheting action) when the first end portion 24 of the belt 22 is attached to an article or transport vehicle. It will also be appreciated that such an actuator might not comprise a lever-type handle (e.g., 102 in FIG. 5), but might rather include some other operator control device such as a button, a latch, a key, or an electronic switch. It will additionally be appreciated that, in another embodiment, a biasing member (e.g., spring 108 in FIG. 5) attached to a carrier (e.g., spool 30) of a restraint assembly might provide sufficient tension upon a belt such that no such actuator might be provided to facilitate locking and unlocking of a carrier by an operator.

The first end portion 24 of the belt 22 may be configured for selective attachment to an article or a transport vehicle. In one use, as shown in FIGS. 1-3, the first end portion 24 of the belt 22 may be attached to a transport vehicle 8 to secure the restraint assembly 20 (and thus, the ATV 10) to the transport vehicle 8. In another use, the first end portion 24 of the belt 22 may be attached to a remote portion of the cargo rack assembly 11 to facilitate securement of an article (e.g., a water bottle or camping gear) to the cargo rack assembly 11. In yet another use, the first end portion 24 of the belt 22 may be attached to another vehicle to facilitate towing of or by the ATV 10. To facilitate these uses, a securing member, such as a hook 28, may be attached to the first end portion 24 of the belt 22. The hook 28 can be formed from stamped, formed, or machined metal, although it will be appreciated that a hook can be provided in any of a variety of other shapes and configurations. It will also be appreciated that the first end portion of the belt may alternatively be provided with any of a variety of alternative securing members (e.g., a magnet, a rope, Velcro), or perhaps with no securing member whatsoever (e.g., such that the end of the belt might itself be suitable for attachment to an article or transport vehicle).

In one embodiment, the housing 21 may be configured to selectively support the first end portion 24 of the belt 22 when the belt 22 is in the stored position. In such an embodiment, as illustrated in FIG. 5, the housing 21 may define at least one support surface (e.g., 27) which is positioned to selectively supportedly engage the first end portion 24 of the belt 22 and/or a securing member (e.g., the hook 28) when the first end portion 24 of the belt 22 is in the stored position. In another embodiment, such as when no housing is provided, a frame of a cargo rack assembly can alternatively or additionally be configured to selectively supportedly engage a first end portion of a belt and/or its securing member when the first end portion of the belt is in a stored position.

The cargo rack assembly 11 may further comprise a retention member configured to facilitate selective retention of the first end portion 24 of the belt 22 with respect to the cargo rack assembly 11. In one embodiment, as illustrated in FIGS. 4 and 5, the retention member may comprise an elongate retention pin 110 and a button 112. In one embodiment, movement of the elongate retention pin 110 and the button 112 can be spring-biased. When the first end portion 24 of the belt 22 is in the stored position, and the hook 28 engages the support surfaces (e.g., 27) of the housing 21 and the frame 14, the elongate retention pin 110 may engage a slot 29 in the hook 28 to selectively secure the first end portion 24 of the belt 22 with respect to the cargo rack assembly 11. The button 112 can facilitate sliding of the elongate retention pin 110 by an operator, such that movement of the button 112 away from the hook 28 correspondingly draws the elongate retention pin 110 away from the hook 28 to release the first end portion 24 of the belt 22. When the elongate retention pin 110 is extended (i.e., when the button 112 is released), as shown in FIG. 5, the elongate retention pin 110 may extend into the slot 29 to secure the first end portion 24 of the belt 22, and the retention member may prevent the first end portion 24 of the belt 22 from unintentionally hanging from the cargo rack assembly 11 and catching on a passing object during travel of the ATV 10. It will be appreciated that a retention member can be provided in any of a variety of alternative suitable configurations (e.g., involving a ball catch, a detent member, or the like) to facilitate selective retention of the first end portion of a belt. In one embodiment, a securing member may define a finger aperture (e.g., 33 in FIGS. 4-5) in which an operator may insert at least one finger to selectively withdraw a first end portion of a belt from a stored position.

When the first end portion 24 of the belt 22 is in the stored position, the belt 22 can be at least substantially collected onto the spool 30, and the restraint assembly 20 may accordingly be at least substantially (i.e., substantially or entirely) disposed within the inner region 18 of the frame 14, as shown in FIG. 4. By providing a restraint assembly integrally with a cargo rack assembly in this configuration, it will be appreciated that the restraint assembly might not add excessive bulk or weight to the vehicle, and accordingly might not detract from the vehicle's performance or aesthetic characteristics. In one embodiment, such an arrangement might be sufficiently streamlined such that the restraint assembly is hardly noticeable when the belt is in the stored position (e.g., see FIG. 4). In one embodiment, when the first end portion 24 of the belt 22 is in the stored position, the first end portion 24 of the belt 22 may conceal the spool 30 and the belt 22 within the inner region 18 (as shown in FIG. 4). However, when the first end portion 24 of the belt 22 is in an extended position, the spool 30 and/or a remaining portion of the belt 22 might be visible (as shown in FIG. 5).

It will be appreciated that a vehicle (e.g., an ATV) can include one or more restraint assemblies as described herein, wherein each of the restraint assemblies can, in one embodiment, be similar to the restraint assembly 20 described above. For example, the ATV 10 of FIGS. 1-3 is shown to comprise four restraint assemblies 20, 40, 60 and 80. Two of the restraint assemblies 20, 40 are shown to be attached to the frame 14 of the cargo rack assembly 11 adjacent to the front end 98 of the chassis 12, while the other two of the restraint assemblies 60, 80 are shown to be attached to the frame 16 of the cargo rack assembly 11 adjacent to the rear end 99 of the chassis 12. As shown in FIG. 3, the restraint assembly 40 can comprise a belt 42, the restraint assembly 60 can comprise a belt 62, and the restraint assembly 80 can comprise a belt 82, each of which can cooperate with the belt 22 of the restraint assembly 20 to facilitate attachment of the ATV 10 to the transport vehicle 8. However, it will be appreciated that multiple restraint assemblies can be provided in association with one or more frames of a cargo rack assembly of an ATV or other vehicle in any of a variety of alternative configurations.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A cargo rack assembly comprising:
a frame tube comprising a cargo support surface and defining an inner region and at least one opening;
a restraint assembly disposed at least partially within the inner region of the frame tube, the restraint assembly comprising:
a belt extending between a first end portion and a second end portion, the first end portion comprising a securing member that defines a slot;
a carrier movably attached to the frame tube, wherein the second end portion of the belt is attached to the carrier, and wherein the carrier facilitates selective dispensation of the securing member between a stored position in which the securing member is adjacent to and substantially covers the at least one opening of the frame tube and an extended position in which the securing member is spaced from the frame tube; and
a retention pin that is movable between an extended position and a withdrawn position, wherein, when the retention pin is in the extended position with the securing member in the stored position, the retention pin extends into the slot to secure the securing member with respect to the frame tube.

2. The cargo rack assembly of claim 1 wherein the securing member comprises a hook.

3. The cargo rack assembly of claim 1 wherein the carrier comprises a spool, and wherein the second end portion of the belt is attached to the spool.

4. A vehicle comprising:
a chassis; and
a cargo rack assembly supported by the chassis, wherein the cargo rack assembly comprises:
a frame tube comprising a cargo support surface and defining an inner region and at least one opening;
a restraint assembly disposed at least partially within the inner region of the frame tube, the restraint assembly comprising:
a belt extending between a first end portion and a second end portion, the first end portion comprising a securing member that defines a slot;
a carrier movably attached to the frame tube, wherein the second end portion of the belt is attached to the carrier, and wherein the carrier facilitates selective dispensation of the securing member between a stored position in which the securing member is adjacent to and substantially covers the at least one opening of the frame tube and an extended position in which the securing member is spaced from the frame tube; and
a resilient member coupled with the carrier and the frame tube, the resilient member being configured to bias the carrier relative to the frame tube; and
a retention pin that is movable between an extended position and a withdrawn position, wherein, when the retention pin is in the extended position with the securing member in the stored position, the retention pin extends into the slot to secure the securing member with respect to the frame tube.

5. The vehicle of claim 4 wherein the securing member comprises a hook.

6. The vehicle of claim 4 wherein the carrier comprises a spool, and wherein the second end portion of the belt is attached to the spool.

7. The cargo rack assembly of claim 1 wherein the securing member further comprises a body and a hook, and the body of the securing member defines a continuous interior perimeter that defines a finger aperture.

8. The cargo rack assembly of claim 3 wherein the at least one opening is positioned adjacent to the spool such that the belt is configured for tangential dispensation from the spool in a direction generally perpendicular to a plane defined by the at least one opening.

9. The cargo rack assembly of claim 3 further comprising an actuator configured to selectively lock and unlock the spool.

10. The cargo rack assembly of claim 9 wherein the spool comprises a toothed wheel and the actuator comprises a handle and a locking member, the handle being engaged with the locking member and configured to move the locking member to and from engagement with the toothed wheel.

11. The cargo rack assembly of claim 3 further comprising a resilient member coupled with the spool and the frame tube, the resilient member being configured to rotatably bias the spool relative to the frame tube.

12. The cargo rack assembly of claim 1 wherein the frame tube further comprises a wall surface and the securing member defines an outer surface and wherein, when in the stored position, the securing member covers the at least one opening of the frame tube such that the outer surface of the securing member is substantially coplanar with adjacent portions of the wall surface of the frame tube.

13. The vehicle of claim 4 wherein the at least one opening is positioned adjacent to the carrier such that the belt is configured for tangential dispensation from the earlier in a direction generally perpendicular to a plane defined by the at least one opening.

14. The vehicle of claim 4 wherein the frame tube further comprises a wall surface and the securing member defines an outer surface and wherein, when in the stored position, the securing member covers the at least one opening of the frame tube such that the outer surface of the securing member is substantially coplanar with adjacent portions of the wall surface of the frame tube.

15. A cargo rack assembly comprising:
a frame tube comprising a cargo support surface and defining an inner region and at least one opening; and a restraint assembly disposed at least partially within the inner region of the frame tube, the restraint assembly comprising: a belt extending between a first end portion and a second end portion, the first end portion comprising a securing member that comprises a body and a hook; and a carrier attached to the frame tube, wherein the second end portion of the belt is attached to the carrier, and wherein the carrier facilitates selective dispensation of the securing member between a stored position in which the securing member is adjacent to and substantially covers the at least one opening of the frame tube and an extended position in which the securing member is spaced from the frame tube; and wherein: the body of the securing member defines a continuous interior perimeter that defines a finger aperture; when the securing member is in the stored position, the hook is at least partially disposed within the inner region of the frame tube; and a retention pin that is movable between an extended position and a withdrawn position, wherein the securing member defines a slot and, when the retention pin is in the extended position with the securing member in the stored position, the retention pin extends into the slot to secure the securing member with respect to the flame tube.

16. The cargo rack assembly of claim 1 further comprising a button coupled with the retention pin, wherein the button facilitates selective release of the retention pin from the withdrawn position.

17. The vehicle of claim 4 wherein the cargo rack assembly further comprises a button coupled with the retention pin, wherein the button facilitates selective release of the retention pin from the withdrawn position.

18. The cargo rack assembly of claim 2 wherein when the securing member is in the stored position, the hook is at least partially disposed within the inner region of the frame tube.

19. The vehicle of claim 4 wherein the securing member further comprises a body and a hook, and the body of the securing member defines a continuous interior perimeter that defines a finger aperture.

* * * * *

UNITED STATES PATENT AND TRADEMARK OFFICE
CERTIFICATE OF CORRECTION

| | | |
|---|---|---|
| PATENT NO. | : 7,946,458 B2 | Page 1 of 1 |
| APPLICATION NO. | : 11/855639 | |
| DATED | : May 24, 2011 | |
| INVENTOR(S) | : Rowdy L. Joseph | |

It is certified that error appears in the above-identified patent and that said Letters Patent is hereby corrected as shown below:

Claim 13, column 9, line 7, change "earlier" to -- carrier --; and

Claim 15, column 10, line 13, change "flame" to -- frame --.

Signed and Sealed this
Second Day of August, 2011

David J. Kappos
*Director of the United States Patent and Trademark Office*